United States Patent [19]

Hiraga et al.

[11] Patent Number: 5,777,776
[45] Date of Patent: Jul. 7, 1998

[54] FULL OPTICAL TYPE OPTICAL ELEMENT

[75] Inventors: Takashi Hiraga; Tetsuo Moriya, both of Tsukuba; Norio Tanaka, Tokyo; Ichiro Ueno, Yokohama, all of Japan

[73] Assignees: Agency of Industrial Science and Technology; Japan Science and Technology Corporation; Dainichiseika Color & Chemicals MFG., Co., Ltd.; Victor Company of Japan, Limited, all of, Japan

[21] Appl. No.: 761,204

[22] Filed: Dec. 6, 1996

[30] Foreign Application Priority Data

Dec. 8, 1995 [JP] Japan ................................ 7-320631

[51] Int. Cl.⁶ ................................................ G02F 1/03
[52] U.S. Cl. ................................ 359/244; 359/107
[58] Field of Search ........................ 359/107, 108, 359/244, 321

[56] References Cited

U.S. PATENT DOCUMENTS

| | | | |
|---|---|---|---|
| 4,166,254 | 8/1979 | Bjorklund | 331/941 SC |
| 4,471,470 | 9/1984 | Swainson et al. | 365/94.5 C |
| 4,597,638 | 7/1986 | Chemla et al. | 350/354 |
| 4,716,449 | 12/1987 | Miller | 357/30 |
| 4,992,654 | 2/1991 | Crossband et al. | 250/213 A |
| 5,268,785 | 12/1993 | Crenslaw et al. | 359/244 |
| 5,502,585 | 3/1996 | Qian | 359/108 |

OTHER PUBLICATIONS

Hiraga et al., "Preparation of Intracavity–Grade Thin Film Using a Optically Nonlinear Organic Compound for the Pulsed Laser Light Compression", *Chemistry Letters*, The Chemical Society of Japan, 1990, pp. 2255–2258.

Hiraga et al., "New Technique for Coprecipitation of Organic Dye with Polymer Under High Vacuum", *Journal Of Vacuum Science Technology*, American Vacuum Society, vol. 12, No. 3, May/Jun. 1994, pp. 876–878.

Hiraga et al., "Fabrication of Dye–Dispersed Optical–Quality Polymer Films by Coprecipitation of Cyanine Dye with Polymers", *Japanese Journal of Applied Physics*, vol. 33, Sep. 1994, pp. 5051–5059.

Hiraga et al., "Properties and Application of Organic Dye Associates In Polymer Matrices", *Thin Solid Films*, Elsevier Science S.A., 1996, pp. 190–194.

*Primary Examiner*—Mark Hellner
*Attorney, Agent, or Firm*—Lorusso & Loud

[57]  ABSTRACT

A full optical type optical element performs an information processing on an input signal light beam through use of only light beams including the signal light beam and an auxiliary light beam for assisting operation. The optical element includes aggregates which are dispersed within the optical element as optical functional aggregates, and which are composed of a single kind or multiple kinds of compounds including a single species of atoms or molecules. Thus, a full optical type optical element having a high resolution can be obtained through use of a thin-film element which contains nanoparticles comprising molecules of an organic compound and associates/aggregates of these molecules.

10 Claims, 3 Drawing Sheets

FULL OPTICAL TYPE OPTICAL ELEMENT

BACKGROUND OF THE INVENTION

1. Field of the Invention

The present invention relates to an optical functional element for optically processing information such as image information, and particularly to a thin-film type optical element having a thin film that contains nanoparticles comprising molecules of an organic compound and associates/aggregates of these molecules.

2. Description of the Related Art

The concept of an optical computer has been proposed, and based on this concept optical arithmetic-and-logic elements have been proposed and manufactured on a trial basis. An example of such an element has a structure such that a partially light-shielding mask is placed in front of a thin flat inorganic crystal ($LiNbO_3$, BBO or the like). A signal light beam and a control light beam are input via the mask to the element for optical arithmetic/logic operation. By changing the light-shielding pattern of this mask, selection can be made from among various arithmetic/logic operations.

Also, for example, in a space light modulator using liquid crystal, liquid crystal is held between two glass substrates, on one of which is disposed a finely patterned transparent electrode together with an electronic drive circuit including thin-film transistors. In this element, a phase transition of liquid crystal is controlled, whereby a required function is effected.

Since the above-described conventional elements for use in an optical computer use a single crystal, a substance to effect a function of an element is a homogeneous system, and a spatial resolution is realized by a spatial restriction method employing a mask or the like. However, the realized spatial resolution cannot be higher than that of the mask itself. This restriction also holds true with a system wherein molecules of an organic compound are monomolarcularly dispersed in a matrix of a polymer or the like, and remains unsolved in essence.

In an element using a single crystal or a monomolecularly dispersed material, a mask plays a role of effecting an arithmetic/logic function. The resolution of a signal light beam of an image or the like is determined by the number of patterns necessary for representing a pixel, i.e. for effecting a single function, per unit area. Also, pixels do not interact with each other; rather, resolution is determined by setting of a condition such that pixels do not interact with each other.

SUMMARY OF THE INVENTION

An object of the present invention is to solve the above-mentioned problems involved in conventional optical elements, and to provide a full optical type optical element which provides a higher resolution through use of a thin-film element which contains nanoparticles comprising molecules of an organic compound and associates/aggregates of these molecules.

In order to attain the above-described object, the present invention provides a full optical type optical element for effecting an information processing on an input signal light beam through use of only light beams including the signal light beam and an auxiliary light beam for assisting operation. The optical element comprises aggregates which are dispersed within the optical element as optical functional aggregates, and which are composed of a single kind or multiple kinds of compounds including a single species of atoms or molecules.

Preferably, each of the aggregates dispersed within the optical element functions as a smallest functional element, so that a spatial resolution associated with image processing is determined by the diameter of the aggregates, not by a diffraction limit determined by the wavelength of a signal light beam. Further, information processing is completed within a single aggregate or between aggregates.

Preferably, within each unit aggregate, the optically excited state of an electron level generated by a signal light beam represents a signal "IN" (ON) state.

Preferably, within the time between input and output of a signal light beam, an optical response to the signal light beam does not remain within each aggregate, but transfers to another aggregate of the same or different kind, so that a signal light beam is output as a consequence of cooperation with aggregates and/or molecules.

Preferably, an excited state, which is generated by the input signal light beam and represents a signal "IN" state, within each aggregate is transferred to another aggregate or to a molecule, by an electric input signal or by a light beam which is different from the signal light beam.

Preferably, the optical element is irradiated with a single or multiple light beams having a wavelength same as or different from that of the signal light beam, oriented coaxially or at an angle with the signal light beam, to thereby control the transfer of the excited state within the optical element.

Preferably, when the excited state is generated by the signal light beam, the optical element is irradiated with an auxiliary light beam having a wavelength same as or different from that of the signal light beam, oriented coaxially or at an angle with the signal light beam, to thereby reduce the intensity of the signal light required for generation of the excited state.

Preferably, the optical element is held between two optical glass substrates or two optically transparent substrates, such as prisms, having optical characteristics, including a surface smoothness and a surface flatness, equivalent to those of the optical glass substrates. After being placed between the substrates, the optical element is sealed in under a vacuum through use of a sealing material to thereby be shielded from the atmosphere.

In this case, light-shielding film strips are preferably arranged equally spaced and in parallel with each other on the inner surface of one of the transparent substrates through which the signal light beam is input. Each of the light-shielding film strips has such dimensions as to not cause scattering of the signal light beam, i.e. it has a width of about 1 micrometer to several tens of micrometers, a thickness of about several tens of nanometers to several tens of micrometers, and a length of about 10 millimeters to several tens of centimeters.

Alternatively, light selective-transmission film strips are arranged equally spaced and in parallel with each other on the inner surface of one of the transparent substrates through which the signal light beam is input. Each of the light selective-transmission film strips has such dimensions as to not cause scattering of the signal light beam, i.e. it has a width of about 1 micrometer to several tens of micrometers, a thickness of about several tens of nanometers to several tens of micrometers, and a length of about 10 millimeters to several tens of centimeters. The light selective-transmission film strips are dielectric thin films of titanium oxide and silicon oxide alternately formed.

In the above two cases, in place of light-shielding film strips or light selective-transmission film strips arranged in parallel with each other and equally spaced, thin-film pieces may be formed such that each piece has a width of about 1 micrometer to several tens of micrometers and a thickness of about several tens of nanometers to several tens of micrometers so as to prevent a signal light beam from scattering, and each of the thin-film pieces may formed into an arbitrary pattern through fine machining, whereby the transfer of an excited state is controlled within the optical element.

Preferably, the aggregates are dispersed in a spatially regular arrangement, for example, in a three-dimensionally latticed arrangement, or molecules within aggregates are regularly oriented, to thereby maintain the wave front, i.e. phase state of the signal light beam which is propagated within the optical element, until the signal light beam is output from the optical element.

Preferably, the state of electrons of part or all of the aggregates is varied by a light beam other than the input signal light beam, or by an external signal having an equivalent effect, to thereby control the phase state of the input signal light beam in order to use information regarding the phase for information processing.

Thus, an optical element having a high resolution can be obtained through use of a thin-film element which contains nanoparticles comprising molecules of an organic compound and associates/aggregates of these molecules.

DESCRIPTION OF THE PREFERRED EMBODIMENTS

Figure 1:
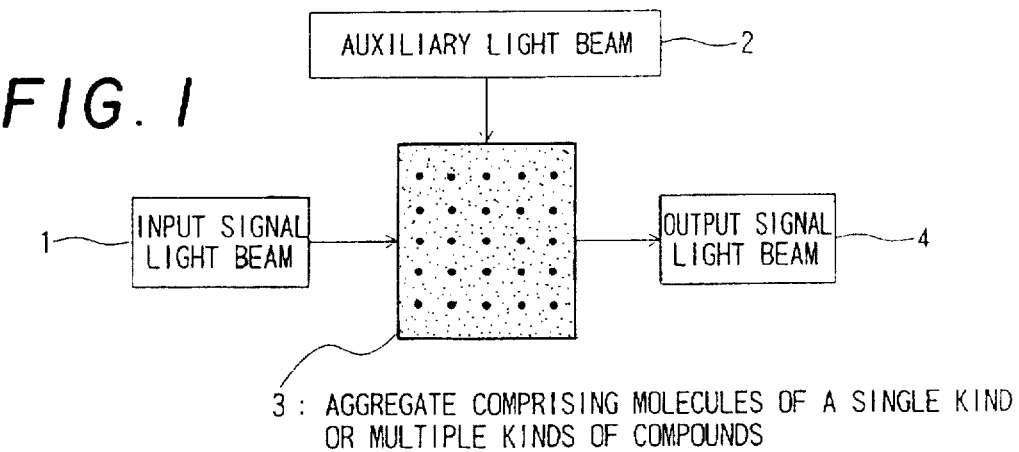
FIG. 1 is a schematic diagram showing the structure of a system for effecting optical information processing through use of a full optical type optical element according to the present invention.

FIG. 1 shows a full optical type optical element of the present invention. An input signal light beam 1 and an auxiliary light beam 2 for assisting the operation are irradiated onto the optical element which includes aggregates 3. The aggregates 3 are dispersed within the optical element as optical functional aggregates, and are composed of a single kind or multiple kinds of compounds including a single species of atoms or molecules. An output signal light beam 4 is output from the optical element.

Each of the aggregates 3 dispersed within the optical element functions as a smallest functional element, so that a spatial resolution associated with image processing is determined by the diameter of the aggregate 3 comprising atoms or molecules, not by a diffraction limit determined by the wavelength of a signal light beam. Further, information processing is completed within a single aggregate 3 or between the aggregates 3.

Also, within each aggregate, the optically excited state of an electron level generated by a signal light beam represents a signal "IN" (ON) state.

In the above-described optical element, within the time between input and output of a signal light beam, an optical response to the signal light beam does not remain within each aggregate, but transfers to a single molecule or to another aggregate of the same or different kind, to thereby output a signal light beam as a consequence of cooperation with aggregates and/or molecules.

Figure 2:
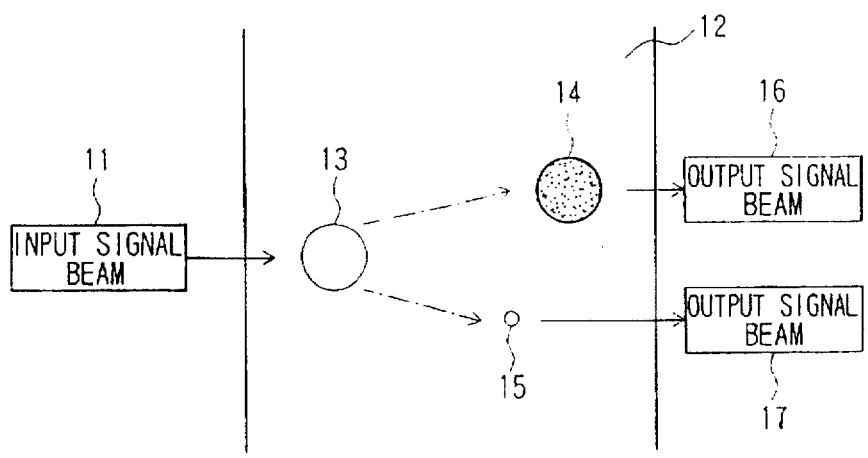
FIG. 2 is a view for illustrating the operation of a full optical type optical element according to the present invention.

That is, as shown in FIG. 2, when an input signal light 11 acts on a aggregate 13 within a thin film 12, an optical response transfers to another aggregate 14 or a single molecule 15, and thus output signal light beams 16 and 17 are output as a consequence of cooperation with the aggregates 13 and 14 and the molecule 15.

An excited state, which is generated by the input signal light beam 11 and represents a signal "IN" state, within the aggregate 13 can be transferred to another aggregate or to a single molecule by an electric input signal or by a light beam which is different from the signal light beam 11.

The above-described optical element is irradiated with a single or multiple light beams having a wavelength same as or different from that of the input signal light beam 11, oriented coaxially or at an angle with the input signal light beam 11, to thereby enable control of the transfer of the excited state within the optical element.

In the above-described optical element, when the excited state is generated by the input signal light beam 11, the optical element is irradiated with an auxiliary light beam having a wavelength same as or different from that of the input signal light beam 11, oriented coaxially or at an angle with the input signal light beam 11, to thereby enable a reduction of the intensity of the signal light required for generation of the excited state.

In the above-described optical element, the optical element is held between two optical glass substrates or two optically transparent substrates, such as prisms, having optical characteristics, including a surface smoothness and a surface flatness, equivalent to those of the optical glass substrates. After being placed between the substrates, the optical element can be sealed in under a vacuum through use of a sealing material to thereby be shielded from the atmosphere.

In the above-described optical element, light-shielding film strips are arranged equally spaced and in parallel with each other on the inner surface one of the transparent substrates through which the signal light beam is input. Each of the light-shielding film strips has such dimensions as to not cause scattering of the signal light beam, i.e. it has a width of about 1 micrometer to several tens of micrometers, a thickness of about several tens of nanometers to several tens of micrometers, and a length of about 10 millimeters to several tens of centimeters.

The light-shielding film described above may be of any kind if it acts as a complete shield against light beams having the same wavelength as that of the input signal light beam and can be finely patterned to the above-described dimensions. That is, the light-shielding film can be a deposition film of aluminum, gold, or a like metal, a sputtered film of aluminum, gold, or a like metal, or a film which is formed by the steps of dispersing or dissolving a coloring material such as carbon black in an electron beam-setting resin, applying the resulting solution to the substrate surface, patterning the applied layer by an electron beam, and finely machining it by dry etching.

Figure 3:
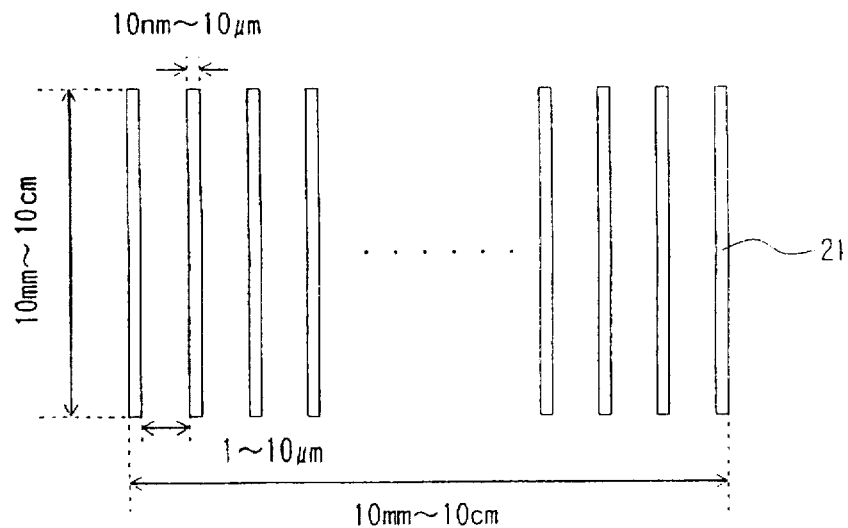
FIG. 3 is a plan view showing the arrangement of light-shielding film strips on a full optical type optical element according to the present invention.
Figure 4:
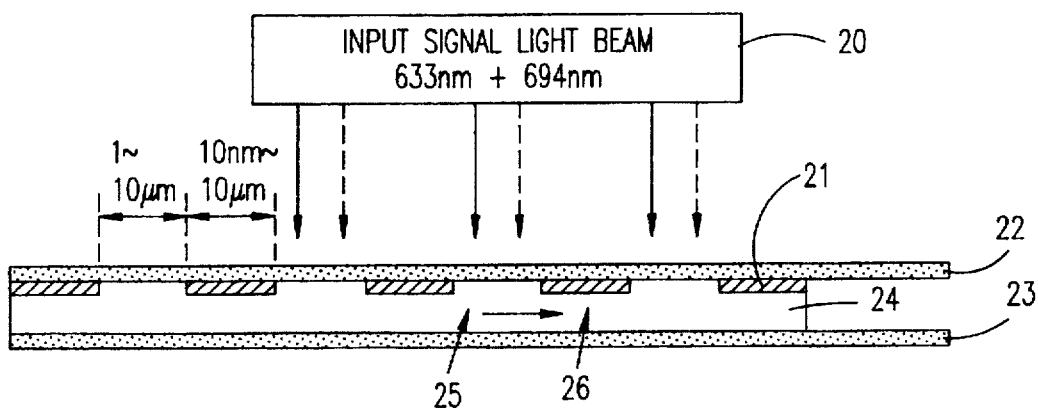
FIG. 4 is a sectional view of a full optical type optical element according to the present invention, in which light-shielding film strips are provided on the optical element.

That is, as shown in FIGS. 3 and 4, light-shielding film strips 21 are arranged equally spaced and in parallel with each other on the inner surface of a transparent substrate 22 through which a signal light beam 20 (633 nm+694 nm) is input. The light-shielding film strip 21 has such dimensions as to not cause scattering of the signal light beam 20, i.e. it has a width of about 1 micrometer to several tens of micrometers, a thickness of about several tens of nanometers to several tens of micrometers, and a length of about 10 millimeters to several tens of centimeters. Numeral 24 denotes a layer comprising a pigment aggregates and a polymer. In FIG. 4, a region 25 where the light-shielding film strip 21 is not disposed has a greater density of an excited state induced by the signal light beam 20, whereas a region 26 where the light-shielding film strip 21 is disposed has a smaller density of an excited state induced by the signal light beam 20. The excited state transfers in the direction of an arrow.

Figure 5:
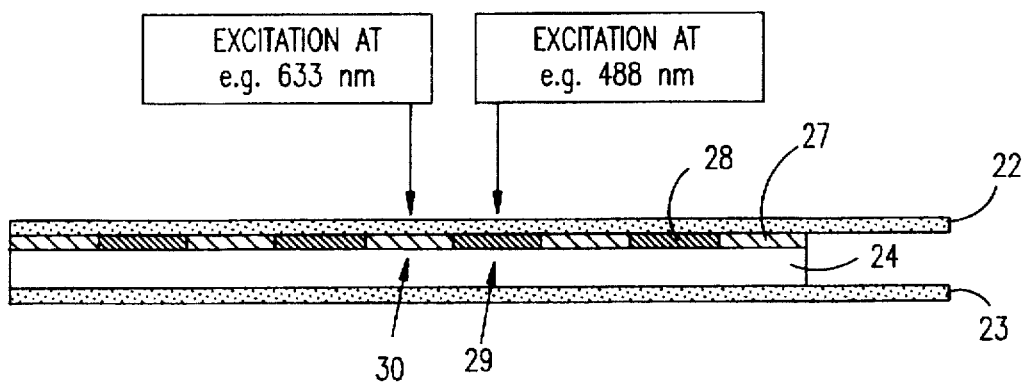
FIG. 5 is a sectional view of a full optical type optical element according to the present invention, in which light selective-transmission film strips are provided on the optical element.

In the above-described optical element, as shown in FIG. 5, in place of the light-shielding film strips 21, light selective-transmission film strips of a single kind or multiple kinds are arranged on the substrate. For example, such light selective-transmission film strips are first light selective-transmission film strips 27 and second light selective-transmission film strips 28. The first light selective-transmission film strip 27 selectively transmits a signal light beam having, for example, a wavelength of 633 nm. Therefore, an excited state region 30 is formed when the excited light has a wavelength of 633 nm. The second light selective-transmission film strip 28 selectively transmits a signal light beam having, for example, a wavelength of 488 nm. Therefore, an excited state region 29 is formed when the excited light has a wavelength of 488 nm.

The light selective-transmission film described above may be of any kind if it transmits a signal light beam having a specific wavelength and can be finely patterned to the above-described dimensions. That is, the light selective-transmission film can be, for example, a film obtained by etching a dielectric multilayer film which comprises titanium oxide and silicon oxide thin-films arranged in alternating layers, or a film which is formed by the steps of dispersing or dissolving a coloring material in an electron beam-setting resin, applying the resulting solution to the substrate surface, patterning the applied layer by an electron beam, and finely machining it by dry etching.

In the above-described optical element, in place of light-shielding film strips or light selective-transmission film strips arranged in parallel with each other and equally spaced, thin-film pieces may be formed such that each piece has a width of about 1 micrometer to several tens of micrometers and a thickness of about several tens of nanometers to several tens of micrometers so as to prevent a signal light beam from scattering, and each of the thin-film pieces may formed into an arbitrary pattern through fine machining, whereby the transfer of an excited state is controlled within the optical element.

Figure 6:
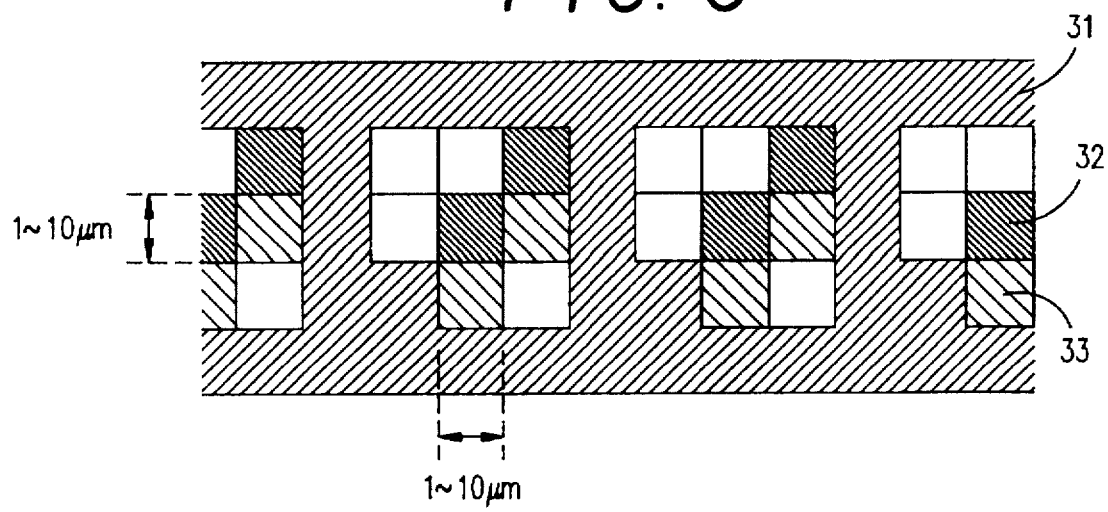
FIG. 6 is a plan view of a full optical type optical element according to the present invention, in which light-shielding film pieces and light selective-transmission film pieces are provided on the optical element.

That is, as shown in FIG. 6, first light selective-transmission film pieces 32 and second light selective-transmission film pieces 33 are formed and arranged in a certain pattern by patterning.

In the above-described optical element, aggregates are dispersed as optical functional aggregates in a spatially regular arrangement, for example, in a three-dimensionally latticed arrangement, or molecules within aggregates are regularly oriented, to thereby maintain the wave front, i.e. phase state of the signal light beam which is propagated within the optical element, until the signal light beam is output from the optical element.

In the above-described optical element, the state of electrons of part or all of the aggregates is varied by a light beam other than the input signal light beam, or by an external signal having an equivalent effect, to thereby control the phase state of the input signal light beam in order to use information regarding the phase for information processing.

Embodiments of the present invention will now be described in detail.

First Embodiment

A first embodiment of the present invention will now be described.

In order to form between two optical glass substrates a transparent polymer thin film which contains monomolecularly dispersed molecules of pigment and pigment aggregates, a known method can be used. Examples of such a method are disclosed in Japanese Patent Application Laid-Open (kokai) Nos. 6-306181 and 6-263885 and Japanese Patent Application Nos. 6-66706 and 6-66707.

The thus-formed optical thin-film element is positioned such that the normal line of the plane forms an angle of 45 degrees with an input signal light beam (for example, a light beam which has passed through a light-shielding mask having the shape of letter "A" and formed on a glass substrate) and such that the normal line of the plane also forms an angle of 45 degrees with an auxiliary light beam which impinges on the optical element in a direction perpendicular to the input signal light beam.

For example, when pigment molecules of DODCI (3,3'-Diethyloxadicarbocyanine Iodide) are monomolecularly dispersed, the pigment and an aggregate of the pigment have a maximum-absorption wavelength of 580 nm. Thus, a wavelength range of about 580±20 nm becomes a nontransmission region. A white light beam (a wavelength of 340 nm to 800 nm) led from a xenon lamp is condensed into a light beam having a diameter of about 100 μm by an optical condenser system composed of a lens or a spherical mirror. The optical thin-film element is irradiated with the condensed light beam. Further, a light beam from the xenon lamp is passed through an optical filter to thereby obtain a light beam (5 mW/cm$^2$) which has a maximum intensity at a wavelength of about 580 nm and which serves as an auxiliary light beam for assisting the operation. The optical thin-film element is also irradiated with the thus-filtered light beam.

Figure 7:
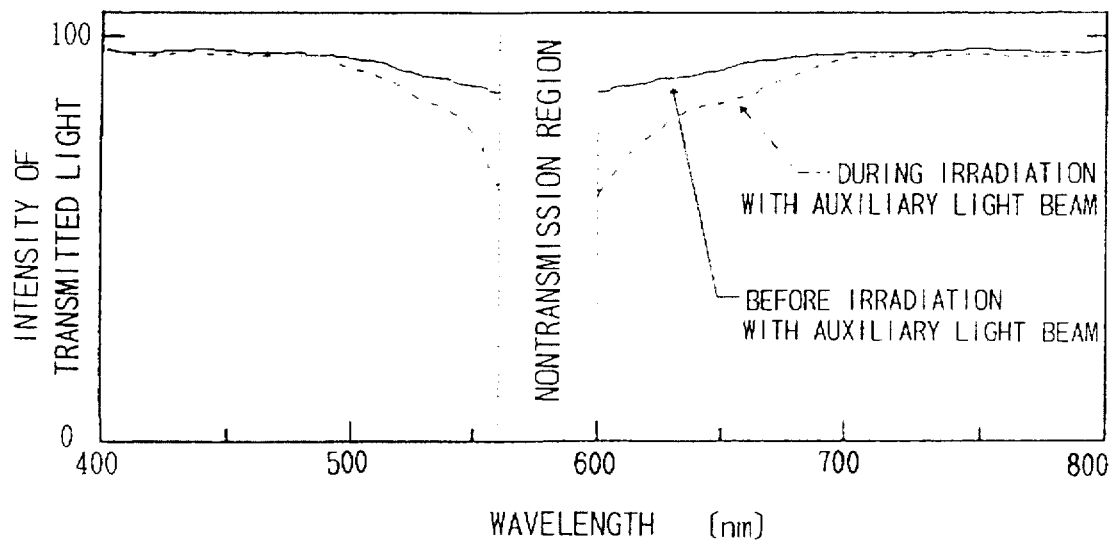
FIG. 7 is a graph showing wavelength vs. intensity of a transmitted light beam for a full optical type optical element according to a first embodiment of the present invention.

FIG. 7 compares transmission spectra before and during irradiation with the auxiliary light beam.

As shown in FIG. 7, irradiation with the auxiliary light beam causes transmittance to decrease at a wavelength range of about 500 nm to 700 nm. This indicates that irradiation with the auxiliary light beam has caused an optically excited state to be induced, resulting in a change of state.

Second Embodiment

Next will be described a second embodiment of the present invention.

A stationary light source was used as a light source to provide a white light beam so that the intensity of the white light beam does not depend on the elapse of time. A laser beam source having a pulse width of, for example, several nanoseconds was used as a light source for an auxiliary light beam for assisting the operation. When the time response to irradiation with the auxiliary light beam was measured, it was found that the response corresponded to the pulse width of the auxiliary light beam, i.e. the response time was less than the order of nanoseconds. That is, it was found that an optically excited state was induced within the full optical type optical element of the present invention only when the optical element was irradiated with the auxiliary light beam.

Third Embodiment

Next will be described a third embodiment of the present invention.

In place of the mask used in the First Embodiment, an aluminum thin film (0.5 μm thick) having an opening portion of a 5 μm width, a light-shielding portion of a 5 μm width, and a length of 1 cm was used as a light-shielding film. An experiment was conducted in a manner similar to that of the First and Second Embodiments. Experiment results equivalent to those of the First and Second Embodiments were obtained at a light intensity (1 mW/cm$^2$) lower than that of the First Experiment. This indicates that an optically excited state induced at the opening portion diffuses to the light-shielded portion, i.e. the optically excited state does not remain in the thus-excited molecules, but transfers to molecules which are not excited.

Fourth Embodiment

Next will be described a fourth embodiment of the present invention.

In place of the light-shielding film used in the Third Embodiment, a light selective-transmission film was used in which first light selective-transmission film strips and second light selective-transmission film strips are alternately arranged. Each of the first light selective-transmission film strips (light transmission region: center wavelength 580 nm; transmission width: 40 nm; transmittance at 580 nm: 95%) has a width of 5 μm and a length of 1 cm. Each of the second light selective-transmission film strips (light transmission region: center wavelength 514 nm; transmission width: 40 nm; transmittance at 514 nm: 95%) has a width of 5 μm and a length of 1 cm.

Figure 8:
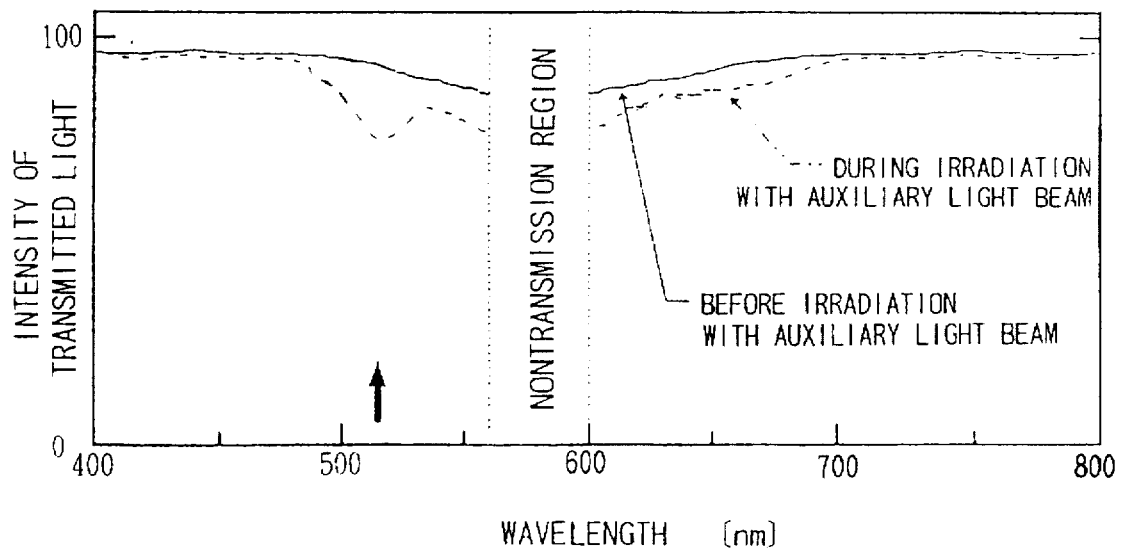
FIG. 8 is a graph showing wavelength vs. intensity of a transmitted light beam for a full optical type optical element according to a fourth embodiment of the present invention.

This mask was produced by the steps of forming a thin film by the vacuum deposition method or the sputtering method and removing unnecessary portions from the thin film by wet etching or dry etching. Experiments were conducted using this mask in a manner similar to that of the First, Second, and Third Embodiments. As shown in FIG. 8, a greater reduction of transmittance was observed where excitation was induced by a light beam which had passed through the second light selective-transmission film strip (center wavelength 514 nm).

The present invention is not limited to the above-described embodiments. Numerous modifications and variations of the present invention are possible in light of the spirit of the present invention and they are not excluded from the scope of the present invention.

As described above, according to the present invention, a full optical type optical element having a high resolution can be obtained through use of a thin-film element which contains nanoparticles comprising molecules of an organic compound and associates/aggregates of these molecules.

What is claimed is:

1. A full optical type optical element for effecting an information processing on an input signal light beam through use of only light beams including said signal light beam and an auxiliary light beam for assisting operation, said optical element comprising a pair of optically transparent substrates with parallel facing surfaces, a plurality of light-shielding film strips on one of the parallel facing surfaces, a transparent polymer film sandwiched between said parallel facing surfaces, and aggregates which are dispersed within said transparent polymer film as optical functional aggregates, wherein said optical function aggregates are each composed of a plurality of molecules of one or more compounds responsive to said auxiliary light beam to perform a function on said input signal light beam.

2. A full optical type optical element according to claim 1, wherein said light-shielding film strips are arranged equally spaced and in parallel with each other on the inner surface of one of the transparent substrates through which a signal light beam is input, each of said light-shielding film strips having a width of about 1 micrometer to several tens of micrometers, a thickness of about several tens of nanometers to several tens of micrometers, and a length of about 10 millimeters to several tens of centimeters, so that said signal light beam is prevented from scattering.

3. A full optical type optical element according to claim 1, wherein said aggregates become excited by the combination of said signal light beam and said auxiliary light beam to change transmissivity of at least a portion of the signal light beam through the optical element.

4. A full optical type optical element according to claim 1, wherein said light-shielding film strips are thin-film pieces formed such that each piece has a width of about 1 micrometer to several tens of micrometers and thickness of about several tens of nanometers to several tens of micrometers so as to prevent a signal light beam from scattering, and each of said thin-film pieces is formed into an arbitrary pattern through fine machining, whereby the transfer of an excited state is controlled within said optical element.

5. A full optical type optical element for effecting an information processing on an input signal light beam through use of only light beams including said signal light beam and an auxiliary light beam for assisting operation, said optical element comprising a pair of optically transparent substrates with parallel facing surfaces, a plurality of light-selective film strips on one of the parallel facing surfaces, a transparent polymer film sandwiched between said parallel facing surfaces, and aggregates which are dispersed within said transparent polymer film as optical functional aggregates, wherein said optical function aggregates are each composed of a plurality of molecules of one or more compounds responsive to said auxiliary light beam to perform a function on said input signal light beam.

6. A full optical type optical element according to claim 5, wherein said light selective-transmissive film strips are arranged equally spaced and in parallel with each other on the inner surface of one of the transparent substrates through which a signal light beam is input, each of said light selective-transmission film strips having a width of about 1 micrometer to several tens of micrometers, a thickness of about several tens of nanometers to several tens of micrometers, and a length of about 10 millimeters to several tens of centimeters, so that said signal light beam is prevented from scattering, and said light selective-transmission film strips being dielectric thin films of titanium oxide and silicon oxide alternately formed.

7. A full optical type optical element according to claim 5, wherein said aggregates become excited by the combination of said signal light beam and said auxiliary light beam to change transmissivity of at least a portion of the signal light beam through the optical element.

8. A full optical type optical element according to claim 5, wherein said selective-transmission film strips are thin-film pieces formed such that each piece has a width of about 1 micrometer to several tens of micrometers and a thickness of about several tens of nanometers to several tens of micrometers so as to prevent a signal light beam from scattering, and each of said thin-film pieces is formed into an arbitrary pattern through fine machining, whereby the transfer of an excited state is controlled within said optical element.

9. A full optical type optical element for effecting an information processing on an input signal light beam through use of only light beams including said signal light beam and an auxiliary light beam for assisting operation, said optical element comprising a pair of optically transparent substrates with parallel facing surfaces, a plurality of light-shielding film strips on one of the parallel facing surfaces, a transparent polymer film sandwiched between said parallel facing surfaces, and aggregates which are dispersed within said transparent polymer film as optical functional aggregates, wherein within the time between input and output of a signal light beam, an optical response to said signal light beam does not remain within each aggregate, but transfers to another aggregate of a kind which is the same as or different from said aggregate, so that a signal light beam is output as a consequence of cooperation with said aggregates.

10. A full optical type optical element according to claim 9, wherein an excited state, which is generated within each aggregate by an input signal light beam and represents a signal input state, is caused to transfer to another aggregate or to a molecule, by an electric input signal or by a light beam which is different from said signal light beam.

* * * * *